C. WAINWRIGHT.
VALVE.
APPLICATION FILED FEB. 4, 1911.
1,036,387.
Patented Aug. 20, 1912.
3 SHEETS—SHEET 1.
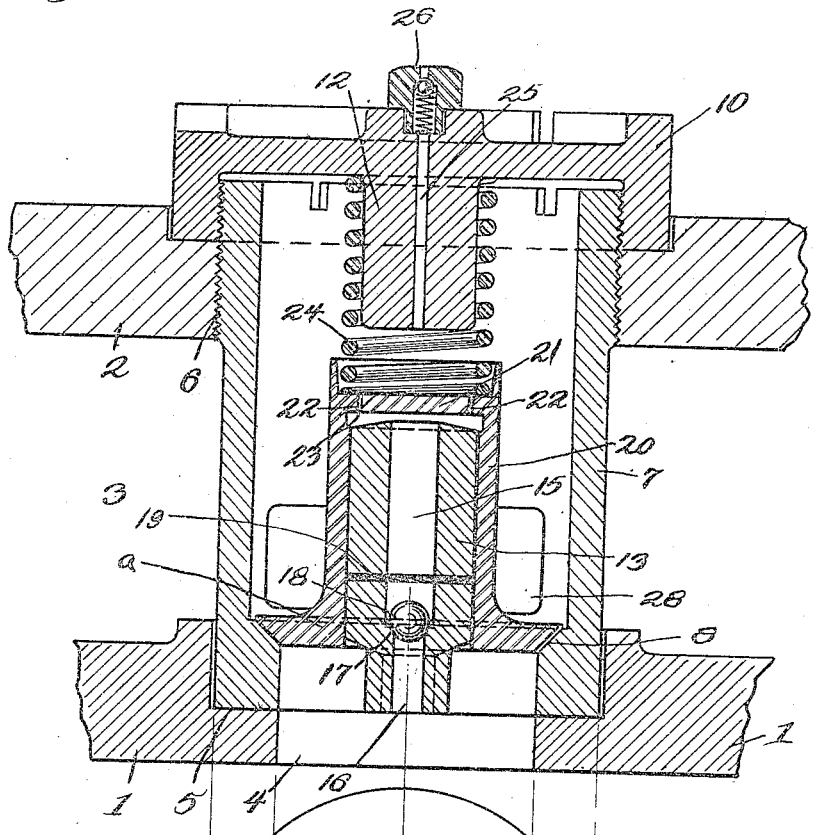
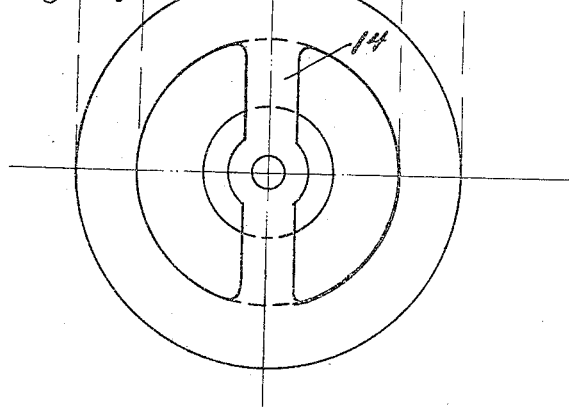

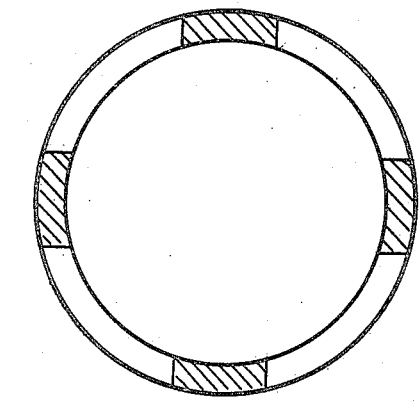
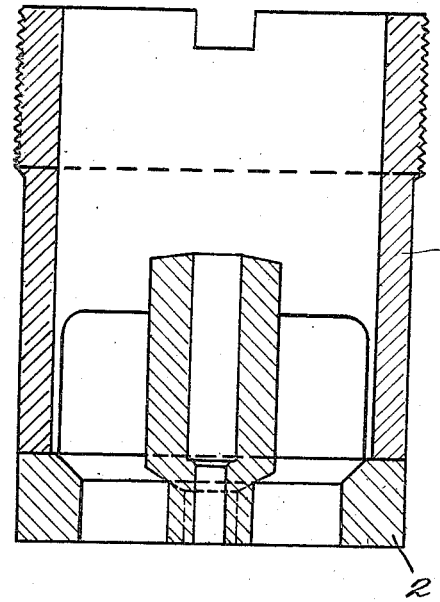
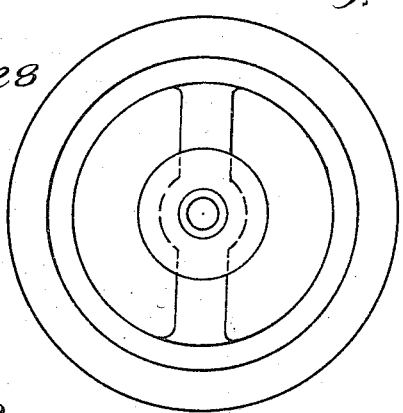

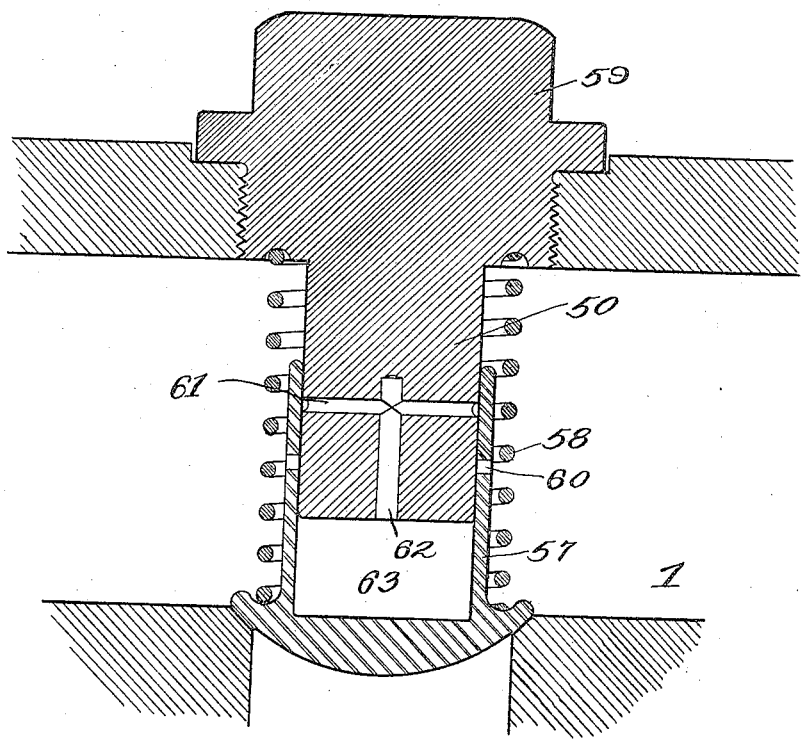

ately.
UNITED STATES PATENT OFFICE.

CHARLES WAINWRIGHT, OF ERIE, PENNSYLVANIA.

VALVE.

1,036,387.

Specification of Letters Patent.     Patented Aug. 20, 1912.

Application filed February 4, 1911. Serial No. 606,540.

*To all whom it may concern:*

Be it known that I, CHARLES WAINWRIGHT, a citizen of the United States, residing at Erie, in the county of Erie and State of Pennsylvania, have invented new and useful Improvements in Valves, of which the following is a specification.

This invention relates to valves and particularly to puppet valves for pump engines. The general object of the invention is to prevent the abrupt seating and consequent wear of the valves of air compressors, and to this end the invention consists in providing means for retarding a valve of an air compressor while the valve is moving toward its seat.

Other objects will appear and be better understood from the following description taken in connection with the accompanying drawings, in which, Figure 1 is a longitudinal section of one embodiment of the invention. Fig. 2 is a detail bottom plan of the cage. Fig. 3 is a longitudinal section of a modified form of cage. Fig. 4 is a horizontal section of the cage shown in Fig. 3 with the guide removed. Fig. 5 is a detail bottom plan of Fig. 4. Fig. 6 is a longitudinal section of a further modification.

In Fig. 1, 1 indicates a section of the cylinder, 2 the casing, and 3 the passage for the compressed air from the cylinder 1.

7 indicates a cage which seats at one end in a depression 5 in the cylinder and connects by means of a screw thread 6 at its opposite end with the casing 2.

4 is the opening through which the compressed air passes to the cage, and 28 is a port through which communication is established between the interior of the cage and the passage 3.

10 is a cap or bonnet for the outer end of the cage 7.

The valve *a* which controls communication between the passage 3 and the opening 4 to the cylinder, is opened as usual during the compression stroke of the piston after which it is seated by the action of a spring 24 which is held against displacement by a boss 12 and which when the valve is open, is compressed.

The tubular portion 20 of the valve is closed at one end by the head 21.

At the lower end portion of the cage there is a cross piece 14 which supports a guide upon which the tubular portion 20 is adapted to slide.

23 and 15 are different portions of an air chamber, one end 16 of which opens into the passage 4, whereby compressed air will be forced into the chamber and against the head 21 during the compression stroke of the compressor. This will have the effect of evenly distributing the pressure over the surface of the valve exposed to the compressed air and, thus prevent any tilting or wabbling tendency of the valve.

18 is a valve which yields substantially synchronously with the valve *a* during the compression stroke of the compressor. This will have the effect of admitting the compressed air into the chamber 23 but at the end of the compression stroke and when the valve *a* begins to move under the action of the spring 24, the compressed air in the chamber 23 will seat the valve 18. Now, when it is remembered that the volume of the air chamber is greater when the valve *a* is open than as shown in Fig. 1, it will be manifest that when the valve 18 is in its seat 17 and the valve *a* is moving to closed position, the air in the chamber 23 will be compressed and thereby retard the movement of the valve *a* under the action of its spring 24. Thus it will be seen that the valve will not be slammed abruptly to its seat and will not soon wear out.

It is not desired to retain the air in the chamber 23 and, therefore I provide the vents 22—22 which form choked passages and permit the air to gradually escape during the movement of the valve *a* under the action of its spring.

19 is a stop which extends across the portion 15 of the chamber and limits the movement of the valve 18 in one direction.

Oil to the parts is conveyed through a duct 25 in the boss 12 and a bushing 26 having a spring-pressed valve controls the passage through the duct, the valve in the bushing, however, being adapted to yield under the weight of an oiler when the latter is placed thereon.

In the structure shown in Figs. 3, 4 and 5, the cage 28 is made separate from the valve seat ring 29 and as shown in Fig. 6, the cage 28 may be held down upon the ring 29 by means of a set screw 30 threaded into the cap 31. This cap is threaded in the casing 2 and carries the set screw which abuts the upper end of the cage 28 and in this instance the cage is not threaded into the casing as is shown in Fig. 1. The cage 28 of Fig. 6 comprises a substantially circular structure with a cylindrical central opening 32 having communication with the passage 3 by means of ports 33 and 34. The former port 33 is controlled by a ball valve 35 pressed into engagement with its seat by a spring 36 whose other end is seated in a socket 37 formed in the cap 31. A suitable valved oil port 38 extends through the cap directly to the port 33 where oil is fed to the main valve 38 which works in the opening or socket 32. The valve 38 is held upon a seat 39 by a spiral spring 40 which engages the cage and an upper portion of the valve flange and is moved off of its seat by pressure in the cylinder against the tension of the spring 40. When the valve rises the air in the cylinder passes out of the port 4 through suitable ports 41 formed in the cage to the passage 3 and the air in the chamber 42 which is formed between the upper end of the cylinder and the end of the socket 32 raises the valve 35 off its seat and passes out of the ports 33 and 34 into the passage ways. When the piston in the cylinder recedes from the valve, the ball valve 35 seats and closes the chamber 42, thus upon further downward movement of the valve 38 and under the action of the spring 40, a vacuum is formed in the chamber 42 which retards the seating of the valve 38 and thereby cushions its action.

In Fig. 7, the casing 2 has a plug 44 threaded thereinto which is provided with an inwardly extending guiding projection 45 which is surrounded by the valve operating spring 46. The plug and guiding extension 44 and 45 are apertured as at 47 and 48, the latter being somewhat reduced so as to provide a seat 49 for the ball valve 50 which is held in place by a spiral spring 51. The spring is secured within the plug 44 by a tension nut 52 and the ports 47 and 48 communicate with the passages 3 by means of a port 53. The valve which is used in this construction is shown at 54 and seats directly against the cylinder 1, being pressed thereagainst by the spiral spring 46. When the valve ascends under the impetus of pressure in the cylinder, the air which is in the chamber 55 formed between the valve and the projection rushes up the port 47 and out through the port 53 displacing the valve 50 in this movement. When the pressure in the cylinder is decreased and the valve 54 descends under the impetus of the spring 46, the valve 50 closes and a vacuum is formed in the chamber 55 thus cushioning the valve upon its seat.

In the structure shown in Fig. 8, the guiding projection 50 is surrounded by the valve 57 which seats directly upon the cylinder 1 and is operated upon by the spiral spring 58 which engages the valve and the plug 59 in a manner similar to the arrangement shown in Fig. 7. In this instance, however, the valve is provided with diametrically opposite apertures 60 which are adapted to register with suitable ports 61 formed across the projection 50 and which are in communication with a central vertical port 62 from the chamber 63. The chamber 63 is formed between the head of the valve 57 and the end of the projection. When the valve rises against the tension of the spring 58, air is compressed in the chamber 63 until the ports 60 and 61 register at which time the compressed air is expelled through these ports. If the valve rises higher upon the projection and the ports 60 extend beyond the ports 61, the air will be further cushioned in the chamber 63 and thus prevent knocking between the head of the valve and end of the projection. When the ports 60 pass the ports 61 in the downward movement of the valve, a vacuum is formed and the seating of the valve against the seat on the casing is properly cushioned.

Having thus described the invention, what is claimed is—

1. In combination with an air compressor valve formed with an air chamber which is open at one end; of a valve for the open end of the chamber adapted to open automatically with the opening of the compressor valve and to close automatically and seal the chamber during the closing of the compressor valve.

2. In an air compressor, the combination with a valve adapted to be connected to the compressor and including a valve body, and a guide therefor; of an air chamber having a portion located between the valve body and the guide and another portion opening into the compressed air passage of the compressor.

3. In an air compressor, the combination with a valve adapted to be connected to the compressor and including a valve body, and a guide therefor; of an air chamber having a portion located between the valve body and the guide and another portion valve controlled and opening into the compressed air passage of the compressor, and a valve arranged in the last-named portion of the chamber.

4. In a valve for compressors, a valve body forming one wall of an air chamber, a guide for the valve body and adapted to form another wall of the chamber and having a passage for compressed air from the compressor to the chamber.

5. In a valve for compressors, a valve body forming one wall of an air chamber, a guide for the valve body and adapted to form another wall of the chamber and having a valve controlled passage for the compressed air from the compressor to the chamber.

6. In a valve for compressors, a valve body adapted to form one wall of an air chamber and to open under the action of compressed air from the compressor, a guide for the valve body and adapted to form another wall of the chamber and having a passage for compressed air from the compressor to the air chamber, and a valve adapted for closing the passage prior to the closing of the first mentioned valve.

7. In a valve for compressors, a valve body adapted to open under the action of compressed air from the compressor and having an apertured end portion adapted to form one wall of an air chamber, a guide for the valve body adapted to form another wall of the air chamber and having a passage for compressed air from the compressor to the air chamber, and a valve adapted for closing the passage prior to the closing of the first mentioned valve.

8. In a valve for compressors, a valve body adapted to be opened by the compressed air from the compressor and also adapted to form one wall of an air chamber, a guide for the valve body and having a passage communicating with the air chamber, a valve controlling the passage and adapted to be opened by the air from the compressor and synchronously with the first named valve, said second named valve being further adapted to close the passage automatically during the closing of the first named valve for the purpose described.

In testimony whereof I affix my signature in presence of two witnesses.

CHARLES WAINWRIGHT.

Witnesses:
C. A. MASTEN,
E. SHERMAN.

Copies of this patent may be obtained for five cents each, by addressing the "Commissioner of Patents, Washington, D. C."